March 28, 1961 P. GINDES ET AL 2,976,734
ACCELEROMETER
Filed Dec. 18, 1957 4 Sheets-Sheet 1

INVENTORS:
Philip Gindes
Arthur C. Hughes, Jr.

By Smyth & Roston
Attorneys

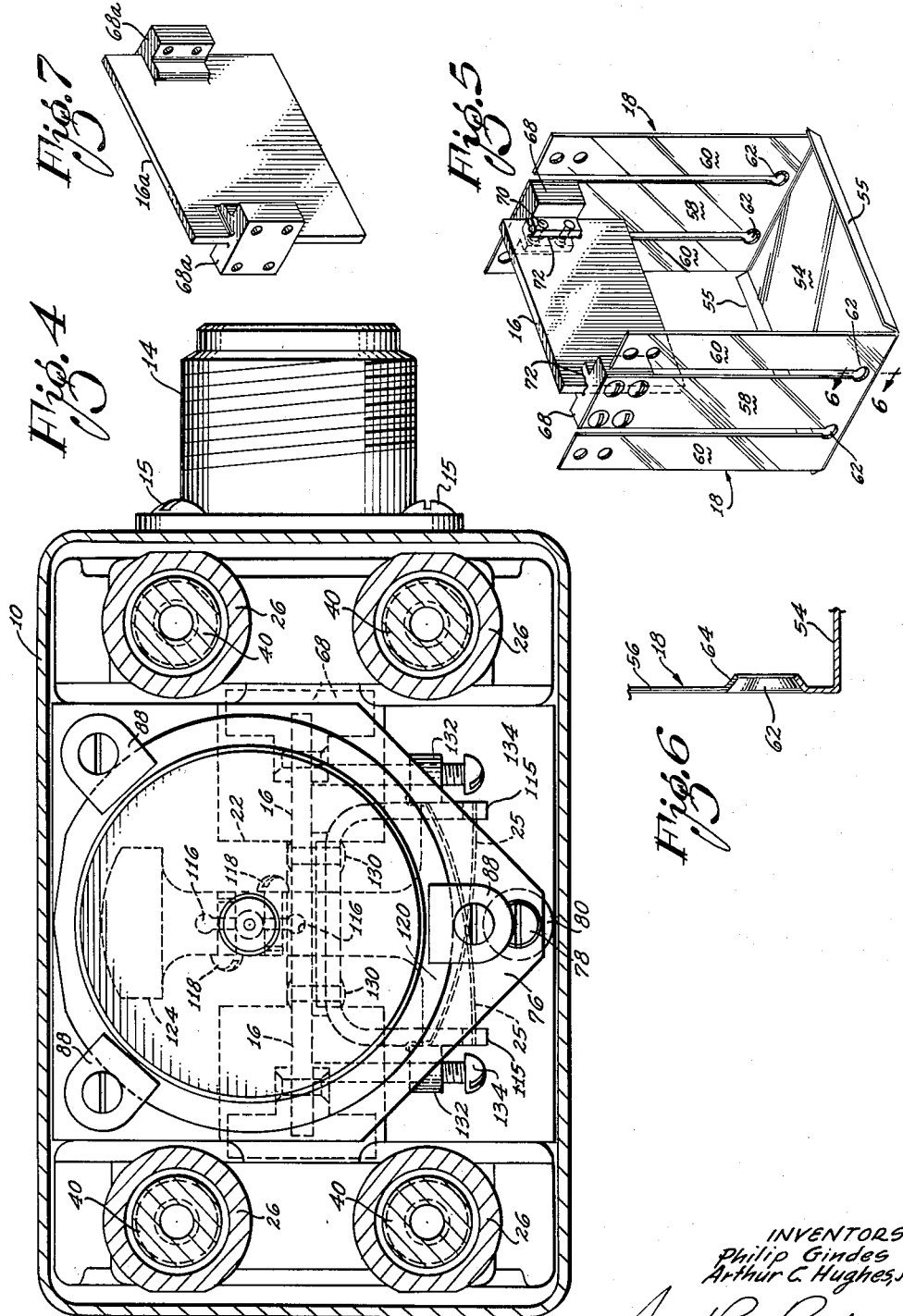

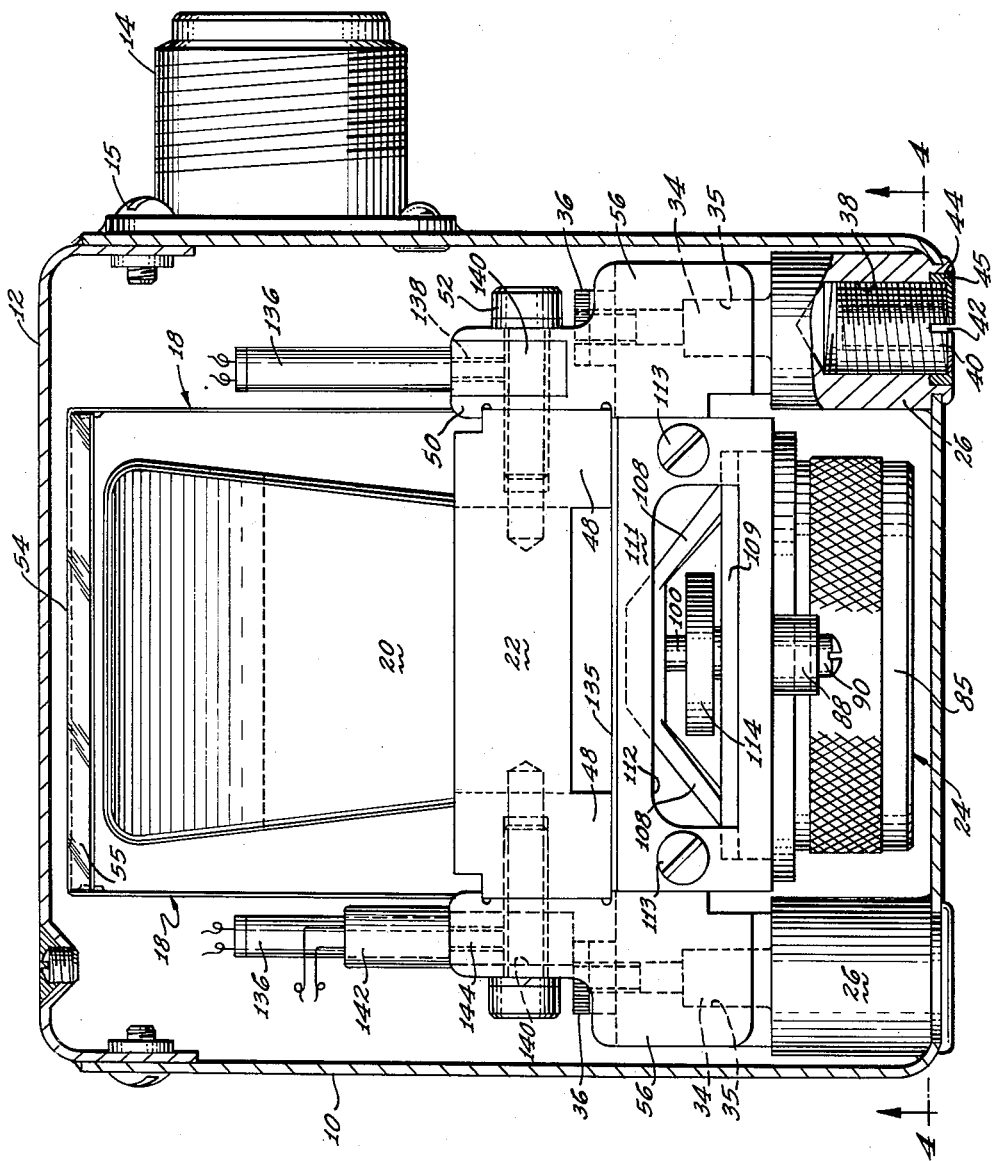

March 28, 1961 P. GINDES ET AL 2,976,734
ACCELEROMETER
Filed Dec. 18, 1957 4 Sheets-Sheet 4

INVENTORS.
Philip Gindes
Arthur C. Hughes, Jr.

By Smyth & Rostow
Attorneys,

United States Patent Office 2,976,734
Patented Mar. 28, 1961

2,976,734

ACCELEROMETER

Philip Gindes, Los Angeles, and Arthur C. Hughes, Jr., Pacific Palisades, Calif., assignors to Genisco, Inc., Los Angeles, Calif., a corporation Filed Dec. 18, 1957, Ser. No. 703,543

4 Claims. (Cl. 73—514)

This invention relates to accelerometers for sensing and measuring the accelerations of a moving body such as a missile.

The invention is directed to a number of problems. One problem is to design an accelerometer to stand up under extremely adverse conditions of vibration and shock. Another problem is to achieve accuracy in the fabrication of an accelerometer and to maintain such accuracy in service. A further problem is to generate signals for indicating the responsive movements of the sensing mass of the accelerometer with high accuracy.

It is highly advantageous to mount the sensing mass of such an accelerometer on a pair of what are commonly called E springs. A pair of E springs is formed by a sheet of resilient material such as Phosphor bronze which is bent to form two vertical end portions interconnected by an upper horizontal web. Each end portion has two spaced vertical slots that extend nearly to the upper web. The resulting E configuration at each end provides a downwardly extending middle leg or spring element flanked by two narrower legs or spring elements. The lower ends of the four narrower legs are firmly attached to fixed support structure and the lower ends of the two middle legs are attached to the opposite ends of the sensing mass. The result is a resilient suspension structure that confines the movements of the sensing mass to substantially a straight line.

Unfortunately an accelerometer of this construction that is fabricated in the usual manner is too vulnerable to vibration and shock. Too often the E springs crack or break completely at the inner ends of the parallel slots. The invention solves this particular problem by not only enlarging the slots at their inner ends in a circular manner but also by dimpling the circular enlargements. Prior to this improvement the E springs would fail completely in about 20 minutes under a certain severe vibration test. With the improvement, the E springs withstand 11 hours or more hours of the same test and none of the accelerometers with the dimpled E springs have failed in actual service.

The accelerometer with which the invention is concerned is designed to be highly sensitive. For one type of service the accelerometer must respond to G values as low as .0002 and even minute errors are serious. Such errors develop early in the service life of an accelerometer of this type that is constructed in the conventional manner. A feature of the invention is the discovery that these errors arise from slight loosening of rivets at the two ends of the sensing mass where the sensing mass is riveted to T-blocks or end brackets, the end brackets being anchored, in turn, to the middle legs of the two E springs. The invention eliminates this source of error either by using bonding material such as brazing material in addition to the rivets or, preferably, by making the sensing mass and the two end brackets in one piece to completely eliminate the error-causing rivets.

With reference to accuracy in the fabrication of the accelerometer, one feature of the invention is the provision of what may be termed adjustable mounting pads. These mounting pads are in the form of fine threaded screws and are adapted to be sealed by suitable cement. This construction makes it possible to calibrate conveniently and expeditiously the position of the base structure of the accelerometer relative to the sensing axis or path of movement of the sensing mass.

The further problem of deriving signals to indicate with a high degree of accuracy the displacements of the sensing mass is solved by using a highly sensitive rotary signal generator and by employing an advantageous operating arrangement for converting linear longitudinal reciprocation of the sensing mass into corresponding oscillations of the rotary signal generator. In the preferred practice of the invention the rotary signal generator is a highly sensitive rotary transformer and the sensing mass is operatively connected to this transformer by a pair of opposed flexible filaments such as fine wires, as will be explained hereafter.

The various features and advantages of the invention may be understood from the following detailed description taken with the accompanying drawings.

In the drawings, which are to be regarded as merely illustrative:

Figure 2 is a side elevation with the side wall of the housing removed;

Figure 4 is a horizontal section looking upward and taken along the line 4—4 of Figure 2 to show how the sensing mass is operatively connected to the rotary transformer;

Figure 5 is a perspective view of the E spring structure and the sensing mass supported thereby, the E spring being turned up side down for convenience of illustration;

Figure 6 is an enlarged fragmentary section taken as indicated by the line 6—6 of Figure 5 and showing how the material of an E spring is dimpled at the inner ends of the parallel slots; and Figure 7 is a perspective view showing how a sensing mass and two associated end brackets may be forged in one piece to eliminate error-causing rivets.

Figure 1:
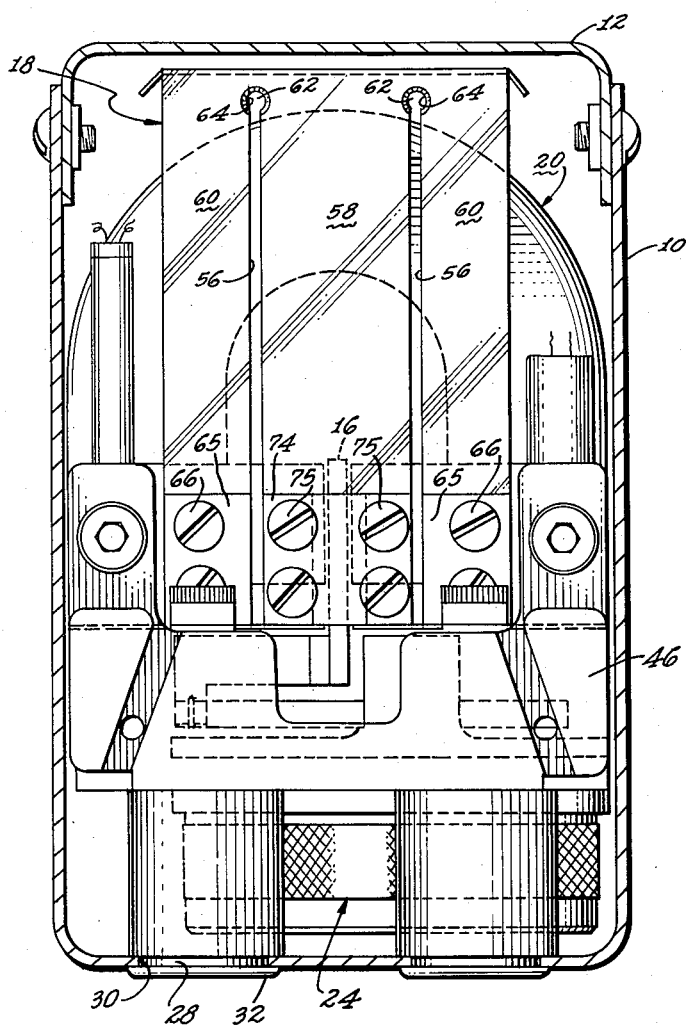
Figure 1 is an end elevation of the presently preferred embodiment of the invention with the end wall of the housing removed to reveal the concealed accelerometer structure.

The principal parts of the presently preferred embodiment of the accelerometer shown in the drawings, include: a box like housing 10 to enclose the moving parts together with a body of suitable liquid; a cover 12 for sealing the housing in a fluid-tight manner; a flanged electrical receptacle 14 mounted on the housing by suitable screws 15 for connecting the electrical components of the accelerometer with outside components; a sensing mass 16 in the form of a plate of copper or other nonmagnetic material; a pair of E springs each generally designated by the numeral 18 for resiliently supporting the opposite ends of the sensing mass; a U-shaped permanent magnet 20 having a pair of pole pieces 22 on opposite sides of the sensing mass 16 to dampen the reciprocative movements of the sensing mass; a rotary detector or signal generator in the form of a rotary transformer 24; and means including a pair of opposed flexible filaments in the form of fine wires 25 to translate the longitudinal reciprocations of the sensing mass into rotation actuation of the signal generator.

The support structure for the moving parts of the accelerometer includes a rectangular support frame that is mounted on four cylindrical support bodies 26 at the four corners of the bottom wall of the housing 10. Each of the cylindrical support bodies 26 is reduced in diameter near its lower end as indicated at 28 in Figure 1 to fit into a corresponding circular aperture 30 in the bottom wall of the housing and the exposed lower end of the support body is peened over to form an anchoring flange 32 for positive engagement with the bottom housing wall. These joints between the four cylindrical support bodies 26 and the bottom wall of the housing are sealed by suitable bonding material such as solder or brazing material. Each of the cylindrical support bodies 26 has an upwardly extending spindle portion 34 (Figure 2) of stepped configuration that extends through a corresponding bore 35 in the rectangular support frame and the upper ends of the four spindle portions 34 are threaded to receive suitable nuts 36 for rigidly anchoring the rectangular support frame to the four cylindrical support bodies.

Each of the four cylindrical support bodies 26 has a relatively large bore 38 that opens on the underside of the housing 10 and is threaded to receive an adjustable mounting pad 40 in the form of a large diameter screw having a diametrical slot 42. The lower outer ends of the bores 38 in the cylindrical support bodies 26 are enlarged to form grooves around the lower ends of the mounting pads 40, as indicated at 44 in Figure 2. When the mounting pads 40 are adjusted by screw action to define a support plane that is accurately calibrated with respect to the sensing axis of the accelerometer, the grooves 44 are filled with a suitable cement 45 to make the adjustments of the mounting pads permanent.

Two of the opposite parallel sides of the rectangular support frame comprise a pair of castings 46 of suitable metal such as aluminum, each of which has one of the previously mentioned bores 35 near each of its opposite ends to receive the spindle portions 34 of the cylindrical support bodies 26. The other two opposite parallel sides of the rectangular support frame comprise the previously mentioned pole pieces 22 of the electromagnet together with blocks 48 of brass or other nonmagnetic material that are bonded to the opposite ends of the pole pieces. The two castings 46 have upwardly extending integral lugs 50 at their opposite ends and the parts of the rectangular support frame are held together by suitable screws 52 that extend through the lugs 50 and into the blocks 48 at the ends of the pole pieces 22.

As best shown in Figure 5, each of the E springs 18 is a vertical end portion or arm of a U-shaped sheet of flexible material such as Phosphor bronze, the two E springs being interconnected by a web 54 of the sheet material that is stiffened by longitudinal side flanges 55. Each of the vertical end portions of the resilient sheet material is formed with a spaced pair of vertical slots 56 which form a middle spring element or leg 58 and two flanking spring elements or legs 60. Preferably, the middle spring leg 58 is approximately twice the width of the individual flanking legs 60.

As heretofore stated, a feature of the invention is the concept of dimpling the two E springs 18 at the inner ends of the vertical slots 56. In the preferred practice of the invention, the vertical slots 56 are formed with circular enlargements 62 at their inner ends and these enlargements are dimpled, i.e. subjected to a punch press operation to form a frusto-conical flange 64 around the circular enlargement as best shown in Figure 6.

The ends of the four narrower legs 60 of the two E springs 18 are fixedly attached to opposite ends of the previously mentioned rectangular support frame. As best shown in Figure 1, the spring legs 60 may be attached to the rectangular support frame by suitable clamp plates 65 and screws 66 that extend through the clamp plates into the rectangular support frame.

In the conventional construction heretofore employed for this particular type of accelerometer, the sensing mass 16 is connected to the ends of the middle spring legs 58 by means of what may be termed T-blocks or end brackets 68. Each of the end brackets 68 is formed with a slot to straddle the end of the sensing mass 16 and the ends of the sensing mass are rigidly connected to the two end brackets by suitable rivets 70. It is a slight loosening of these rivets that has been discovered to be the cause of errors in the accelerometer signals that develop in a relatively short service life when the accelerometer is subjected to continual vibration.

In the practice of the present invention that is illustrated by Figure 5, the sensing mass 16 is not only connected to the end brackets 68 by means of the rivets 70 but is also directly bonded to the end brackets by brazing, the brazing material being indicated at 72 in Figure 5. Thus the rivets 70 serve merely as index means for correct positioning of the parts in preparation for the brazing operation. The assembly of the sensing mass 16 to the two middle spring legs 58 is completed by clamp plates 74 and suitable screws 75 that extend through the clamp plate and the spring legs into the end brackets 68.

In the presently preferred practice of the invention, the sensing mass 16 is made integral with the two end brackets 68, as heretofore stated, to eliminate both the rivets 70 and the necessity for using the brazing material 72. Thus Figure 7 shows a one piece forging which provides a sensing mass 16a and two T-block portions 68a integral therewith.

Figure 3:
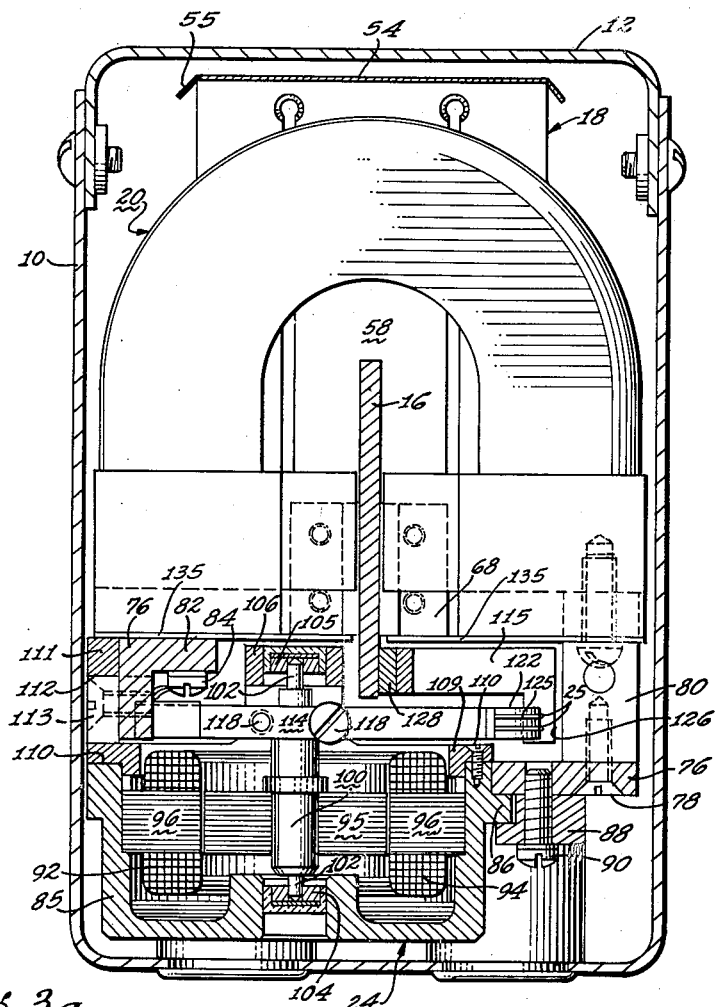
Figure 3 is a transverse sectional view showing the construction of the rotary transformer.

The support structure for the moving parts of the accelerometer further includes a support bracket 76 that is shown in section in Figure 3 and in bottom plan in Figure 4. One end of the support bracket 76 is of tapered configuration as shown in bottom plan in Figure 4 and is supported by a screw 78 that extends upward into a cylindrical support lug 80 (Figure 3), the support lug being unitary with the previously mentioned rectangular support frame. The other end of the support bracket 76 is formed with an overhanging flange 82 as shown in Figure 3 and this overhanging flange is directly anchored to the underside of the rectangular support flange by suitable screws 84.

The rotary transformer 24 has a cup-shaped housing 85 which seats from below in a large circular aperture in the support brackets 76 and which is formed with a radial flange 86 (Figure 3) to abut the undersurface of the support bracket. This cup-shaped housing 85 is securely anchored in place by three support clips 88 (Figure 4) that are attached to the support bracket 76 by suitable screws 90. Each of the support clips 88 is cut away as shown in Figure 3 to clamp the radial flange 86 of the cup-shaped housing 85 against the underside of the support bracket 76.

Figure 3A:
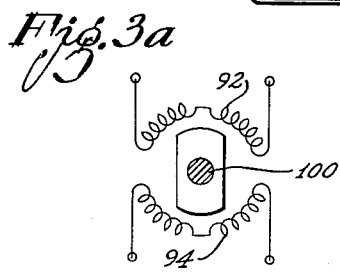
Figure 3a is a wiring diagram illustrating the principle of operation of the rotary transformer.

The general character of the rotary solenoid 24 that serves as the signal generator is indicated by the wiring diagram in Figure 3a. The rotary solenoid has a primary stator coil 92 and a secondary stator coil 94 each of which is of circular configuration of approximately 180° extent. A rotor 95 comprising a noncircular armature is mounted inside the two stator coils 92 and 94 for rotation concentrically thereof, the null position of the rotor being shown in Figure 3a. A constant A.C. voltage is applied to the primary stator coil 92 and the resulting output voltage of the secondary coil 94 is varied in a well known manner in response to rotary displacement of the rotor 95 in either rotational direction from its null position.

Figure 3 shows how the stator coils 92 and 94 are mounted on laminated cores 96 and 98, respectively, in the cup-shaped housing 85 and further shows how the rotor or noncircular armature 95 is mounted on a vertical shaft 100. The lower end of the vertical shaft 100 is reduced in diameter to form a trunnion 102 that is journaled in a jeweled bearing 104. In like manner, the upper end of the vertical 100 forms a second trunnion 102 that is journaled in a second upper jeweled bearing 105. This second upper jeweled bearing 105 is mounted in an upper ring portion 106 of a spider that has legs 108 (Figure 2) that converge upwardly from a lower ring 109. As indicated in Figure 3 the lower ring 109 of the spider is flanged to nest into the cup-shaped housing 85 of the rotary transformer and is secured to the cup-shaped housing by small screws 110. Integral with the lower ring 109 of the bracket is a vertical wall 111 (Figure 3) which, as best shown in Figure 2, forms a window 112. This wall 111 is anchored by screws 113 to the upwardly extending flanged portion of the previously mentioned support bracket 76 (Figure 3) which is formed with a corresponding window.

The means for operatively connecting the sensing mass 16 with the rotor 95 for actuation thereof includes an operating member 114 on the vertical shaft 100, a U-shaped bracket 115 on one side face of the sensing mass and the previously mentioned flexible filaments or wires 25 that connect the two arms of the U-shaped bracket with the operating member 114. The operating member 114 may be bored to receive the vertical shaft 100 and may be formed with diametrically extending slots 116 (Figure 4) on opposite sides of the bore to receive a pair of transverse screws 118 that may be tightened for adjustably fixing the position of the operating member relative to the shaft.

One end of the operating member 114 is formed with a head 120 having an arcuate peripheral surface 122 that is substantially concentric to the axis of the vertical shaft 100. The other end of the operating member 114 is formed with an enlargement 124 (Figure 4) to counterbalance the head 120. The arcuate surface 122 of the head of the operating member 114 makes tangential contact with the two filaments or wires 25 and preferably is formed with peripheral grooves 125 to seat the two wires. The two wires 25 overlap each other and are anchored respectively to opposite ends of the head 120 of the operating member, the other ends of the two wires being anchored to the two arms of the U-shaped bracket 115. As best shown in Figure 3, each of the two arms of the U-shaped bracket 115 has a downwardly extending terminal finger 126 to which the end of the corresponding wire 25 is anchored. The U-shaped bracket 115 backs against a spacer bar 128 (Figure 3) and is secured by a pair of rivets 130 (Figure 4) that extend through the spacer bar and the sensing mass 16.

It is apparent that movement of the U-shaped bracket 115 in one direction by the sensing mass 16 causes one of the two wires 25 to pull on the head of the operating member 114 with the wire unwrapping from the arcuate surface 122, the other wire being simultaneously fed to the arcuate surface with a wrapping action. Thus longitudinal reciprocation of the sensing mass 16 is converted into accurately corresponding oscillations of the rotary armature 95 of the rotary transformer 24.

Preferably suitable means is provided to adjust the tension of the two wires 25. For this purpose, each of the two arms of the U-shaped bracket 115 may be formed with a laterally extending lug 132 (Figure 4) and a suitable adjustment screw 134 may be threaded through the lug 132 for endwise abutment against the side face of the sensing mass 16. Each of the two adjustment screws 134 is tightened somewhat before the two wires 25 are mounted and then the two adjustment screws are manipulated to flex the two arms of the U-shaped bracket as required for the desired tension adjustment of the two wires.

One of the problems that is inherent in the described accelerometer construction is that the magnetic field of the permanent magnet 20 may affect the voltage output of the rotary transformer 24. This problem may be met by placing suitable shield means between the electromagnet and the rotary transformer. In the present embodiment of the invention the shield means comprises a pair of spaced co-planar sheets 135 of ferromagnetic material which are suitably anchored to the underside of the previously mentioned rectangular support frame on opposite sides of the sensing mass 16.

In some practices of the invention it is desirable to add thermostatically controlled heater means. For this purpose, an electrical heater element 136 is mounted on at least one corner of the rectangular support frame. Preferably, there are three heater elements mounted on three corners. Each heater element is formed with a base screw 138 that threads into a block 140 of insulating material, the block 140 being anchored by a corresponding previously mentioned screw 52. The fourth corner of the rectangular support frame carries a suitable thermostat 142 that senses the temperature of the liquid body and energizes the heater elements 136 accordingly to maintain the temperature at a substantially constant value. The thermostat 142 may have a base screw 144 by means of which it is mounted in an insulating block 140 in the same manner as the heater elements.

The manner in which the described accelerometer functions for its purpose may be readily understood from the foregoing description. Acceleration forces having components in the plane of the sensing mass 16 cause corresponding displacement of the sensing mass from its normal null position and the resulting tendency of the resiliency mounted sensing mass to reciprocate is damped by magnetic hysteresis in the nonmagnetic material of the sensing mass. The longitudinal displacements of the sensing mass are transmitted to the rotary armature 95 of the rotary transformer 24, to cause corresponding signal changes in the output of the transformer. The magnetic shield 135 protects the rotary transformer from the flux of the permanent magnet. The sensing mass 16 is mounted on the E springs 18 in a manner that precludes the heretofore troublesome source of error in the loosening of rivets, and the dimpling of the ends of the slots of the E springs makes the E springs capable of withstanding the severe vibrations and shocks involved in the contemplated service of the accelerometer.

Our description in specific detail of the presently preferred practice of the invention will suggest various changes, substitutions and other departures from our disclosure within the spirit and scope of the appended claims.

We claim:

1. In an accelerometer, the combination of: a sensing mass and a pair of E springs resiliently supporting said mass, said E springs comprising flexible metal sheets with slots therein dividing the sheets into leaf spring elements, said sheets being dimpled at the inner ends of said slots to prevent failure of the sheets in the region of the slots, said metallic mass being a one piece metal body with integral flanges directly connected to the two E springs.

2. A combination as set forth in claim 1 in which the inner ends of said slots have dimpled circular enlargements with frusto-conical flanges.

3. In an accelerometer, the combination of: a support structure; a sensing mass resiliently mounted on said support structure to reciprocate along a given path relative thereto; indicating means including a rotary signal-controlling component; a rotary operating member connected to said rotary component for actuation thereof, said member having an arcuate surface substantially concentric to its axis of rotation; a bracket fixedly mounted on said mass, said bracket having two spaced arms with threaded bores therein; two oppositely extending flexible filaments operatively connecting said two arms respectively of the bracket with said member for actuation thereof in response to reciprocation of the mass, said filaments overlapping and being anchored to opposite portions of said arcuate surface and extending substantially tangentially of the arcuate surface for wrapping action against the surface; and screws in said threaded bores of said two bracket arms respectively engaging said mass to flex the arms for adjustment of the tension of the two filaments.

4. A combination as set forth in claim 3 in which said bracket is U-shaped and the arms thereof have laterally extending lugs, said lugs having said threaded bores; and in which the ends of said screws exert pressure against said mass laterally thereof to variably flex said arms.

References Cited in the file of this patent

UNITED STATES PATENTS

| Number | Name | Date |
|---|---|---|
| 771,935 | Reynolds | Oct. 11, 1904 |
| 982,336 | Wimperis | Jan. 24, 1911 |
| 1,117,892 | Norris | Nov. 17, 1914 |
| 1,145,256 | Mochow et al. | July 6, 1915 |
| 1,552,186 | Anderson | Sept. 1, 1925 |
| 2,141,071 | Sorensen | Dec. 20, 1938 |
| 2,209,045 | Witte | July 23, 1940 |
| 2,445,638 | Saks | July 20, 1948 |
| 2,488,734 | Mueller | Nov. 22, 1949 |
| 2,640,900 | Klose | June 2, 1953 |
| 2,692,357 | Nilson | Oct. 19, 1954 |
| 2,702,186 | Head et al. | Feb. 15, 1955 |
| 2,706,401 | Spaulding | Apr. 19, 1955 |
| 2,768,359 | Side | Oct. 23, 1956 |
| 2,822,161 | Tikanen | Feb. 4, 1958 |
| 2,835,774 | Statham | May 20, 1958 |
| 2,878,775 | Taylor | Mar. 24, 1959 |
| 2,884,038 | Overton | Apr. 28, 1959 |